(12) United States Patent　　　　　　　　(10) Patent No.:　　　US 9,350,185 B2
　　　Longdon et al.　　　　　　　　　　　　(45) Date of Patent:　　　　　May 24, 2016

(54) POWER OUTPUT DISTRIBUTION AND CONTROL SYSTEM FOR MULTI-OUTPUT BATTERY CHARGER

(71) Applicant: Blue Sea Systems, Inc., Bellingham, WA (US)

(72) Inventors: Russell T. Longdon, Stanwood, WA (US); Wayne Kelsoe, Bellingham, WA (US)

(73) Assignee: Blue Sea Systems, Inc., Bellingham, WA (US)

( * ) Notice: Subject to any disclaimer, the term of this patent is extended or adjusted under 35 U.S.C. 154(b) by 267 days.

(21) Appl. No.: 14/081,495

(22) Filed: Nov. 15, 2013

(65) Prior Publication Data

US 2015/0077040 A1　　Mar. 19, 2015

Related U.S. Application Data

(60) Provisional application No. 61/878,528, filed on Sep. 16, 2013.

(51) Int. Cl.
　　*H02J 7/00*　　　　　(2006.01)
(52) U.S. Cl.
　　CPC .............. *H02J 7/0052* (2013.01); *H02J 7/007* (2013.01)
(58) Field of Classification Search
　　CPC ............................ H02J 7/0013; H02J 7/0014
　　USPC ........................ 320/107, 118–120, 124, 162
　　See application file for complete search history.

(56) References Cited

U.S. PATENT DOCUMENTS

| 5,557,189 | A | * | 9/1996 | Suzuki | H01M 10/44 320/119 |
|---|---|---|---|---|---|
| 6,208,194 | B1 | | 3/2001 | Kennedy | |
| 6,469,564 | B1 | | 10/2002 | Jansen | |
| 2005/0218964 | A1 | | 10/2005 | Oswald et al. | |
| 2011/0234165 | A1 | * | 9/2011 | Palatov | H02J 7/0004 320/119 |
| 2011/0248678 | A1 | * | 10/2011 | Wade | H02J 7/0014 320/119 |

* cited by examiner

*Primary Examiner* — Paul Dinh
(74) *Attorney, Agent, or Firm* — Michael Best & Friedrich LLP

(57) ABSTRACT

Systems and methods for providing a single power source, multi-output battery charger configured to transition individual batteries coupled to its output from the absorption stage to the float stage independent of other batteries also coupled to its output. The power source may be any suitable power source, such as an AC/DC converter, solar panels, wind generators, alternators, etc. A programmable controller with suitable circuitry is utilized to control a voltage drop across a variable voltage drop blocking device coupled between the output of the power source and a terminal of a rechargeable battery to selectively transition individual batteries coupled to the power source output from the absorption stage to the float stage once they have reached full charge. Using the battery chargers disclosed herein, auxiliary batteries are not subjected to the full absorption voltage for an extended duration after they are charged, thereby reducing the likelihood of undesirable overcharging.

31 Claims, 6 Drawing Sheets

POWER OUTPUT DISTRIBUTION AND CONTROL SYSTEM FOR MULTI-OUTPUT BATTERY CHARGER

CROSS REFERENCE TO RELATED APPLICATION

This application claims priority to U.S. Provisional Patent Application No. 61/878,528 filed Sep. 16, 2013, the contents of which are hereby incorporated by reference in it entirety.

BACKGROUND

A battery can deliver a current to a load such as an engine, a light or a radio for a considerable length of time. As long as the potential difference between its terminals remains close to a nominal value and a sufficient current is generated, current will flow to the load. As the current flows, the battery's capacity to drive the load becomes diminished and may eventually become exhausted.

To replenish this loss, a battery may be connected to a source that provides positive and negative charges to its electrodes. The charges are transported from one terminal to another in a direction that is opposite to the bias of the terminals. A device that accomplishes this transport may be referred to as a battery charger. Battery chargers provide a current to and a voltage across the battery in accordance with an algorithm or "charge profile."

For lead-acid batteries, charging generally takes place in three separate steps or stages: bulk, absorption, and float. The first step in the battery charging process is the bulk stage, or constant current charging. During this stage, the input current to the battery is set at the maximum safe rate the battery will accept, or the maximum that the charger can supply, until voltage rises to near the fully charged level (e.g., 75-80% of final charge). Once the battery is charged to 75-80% of its final charge, the battery charger may be moved to the absorption charging stage, also sometimes referred to as the constant voltage charging stage. During this stage, the input voltage to the battery is held constant while the current is gradually tapered off. Omitting this step (i.e., simply using the battery at the 75-80% state of charge) can eventually cause some batteries to lose their ability to accept a full charge. The third and final step in the three stage battery charging process is the float phase, or sometimes referred to as the maintenance phase. After a battery reaches its full charge during the absorption stage, the input voltage is lowered to a reduced level. This step compensates for the battery's tendency to self-discharge, and further allows for the reduction in gassing, as well as helping to prolong the battery's life. In general, for lead-acid batteries oxygen and hydrogen gas will be released at recharge voltages of between 13.8 volts and 14.2 volts.

On a 12 volt battery, the no load battery voltage is between 11.4 volts, fully discharged, and 12.9 to 13.0 volts, fully charged. When the battery charger is connected to the battery and then turned on by plugging it in to a power source, the charger will operate in the bulk stage and will attempt to bring the battery voltage up to the level required to be in absorption stage. Generally, this voltage may be in the 14.2 to 15.0 volt range. The actual voltages may depend on various factors including type of battery (e.g., gel, absorbed glass-mat (AGM)), age of battery, etc.).

The transition from absorption stage to the float stage is determined either by a timer, or by the battery charger sensing the value of charge current and then switching over when the charge current drops below a certain threshold. For example, a battery charger may switch out of absorption mode when the charge current falls below 5 amps, or when the absorption mode has lasted for at least eight hours.

In the float stage, the magnitude of the voltage may be a few tenths of a volt above the no load, fully charged voltage, e.g., between 13.2 and 13.6 volts.

In some applications, it is desirable to have a battery charger with multiple outputs to facilitate charging multiple batteries (or multiple battery banks) simultaneously. One type of such battery charger is a switched-mode multi-output battery charger. These types of battery chargers may be constructed as multiple switch-mode converters, single converters with isolated secondary windings, or single converters with output distribution circuitry. Single converter chargers with output distribution circuitry are often chosen for higher capacity charging applications (e.g., 25 amps and higher) because the converter circuitry can be used most efficiently to supply the needs of a primary battery while also meeting the needs of one or more auxiliary batteries.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to providing a single power source, multi-output battery charger configured to transition individual batteries coupled to its outputs from the absorption stage to the float stage independent of other batteries also coupled to its outputs. The power source may be any suitable power source, such as an AC/DC converter, solar panels, wind generators, alternators, etc. In a typical use of a multi-output battery charger, one battery is deeply discharged while one or more auxiliary batteries, frequently of lessor capacity, are nearly fully charged at the start of a charge cycle. Using conventional multi-output chargers, the auxiliary batteries are served with the same or greater voltage than the battery needing a full charge. These conventional chargers therefore apply the higher absorption stage voltage level to the auxiliary batteries for many hours to charge the discharged battery when an ideal charge profile would have allowed for dropping to a float stage voltage level much sooner for the one or more auxiliary batteries that have reached full charge.

In the embodiments disclosed herein, a programmable controller with suitable circuitry is utilized to control a voltage drop across a variable voltage drop blocking device coupled between the output of the power source and a terminal of a rechargeable battery to selectively transition individual batteries coupled to the power source output from the absorption stage to the float stage once they have reached full charge. Using the battery chargers disclosed herein, auxiliary batteries are not subjected to the full absorption voltage for an extended duration after they are charged, thereby reducing the likelihood of undesirable overcharging.

Figure 1:
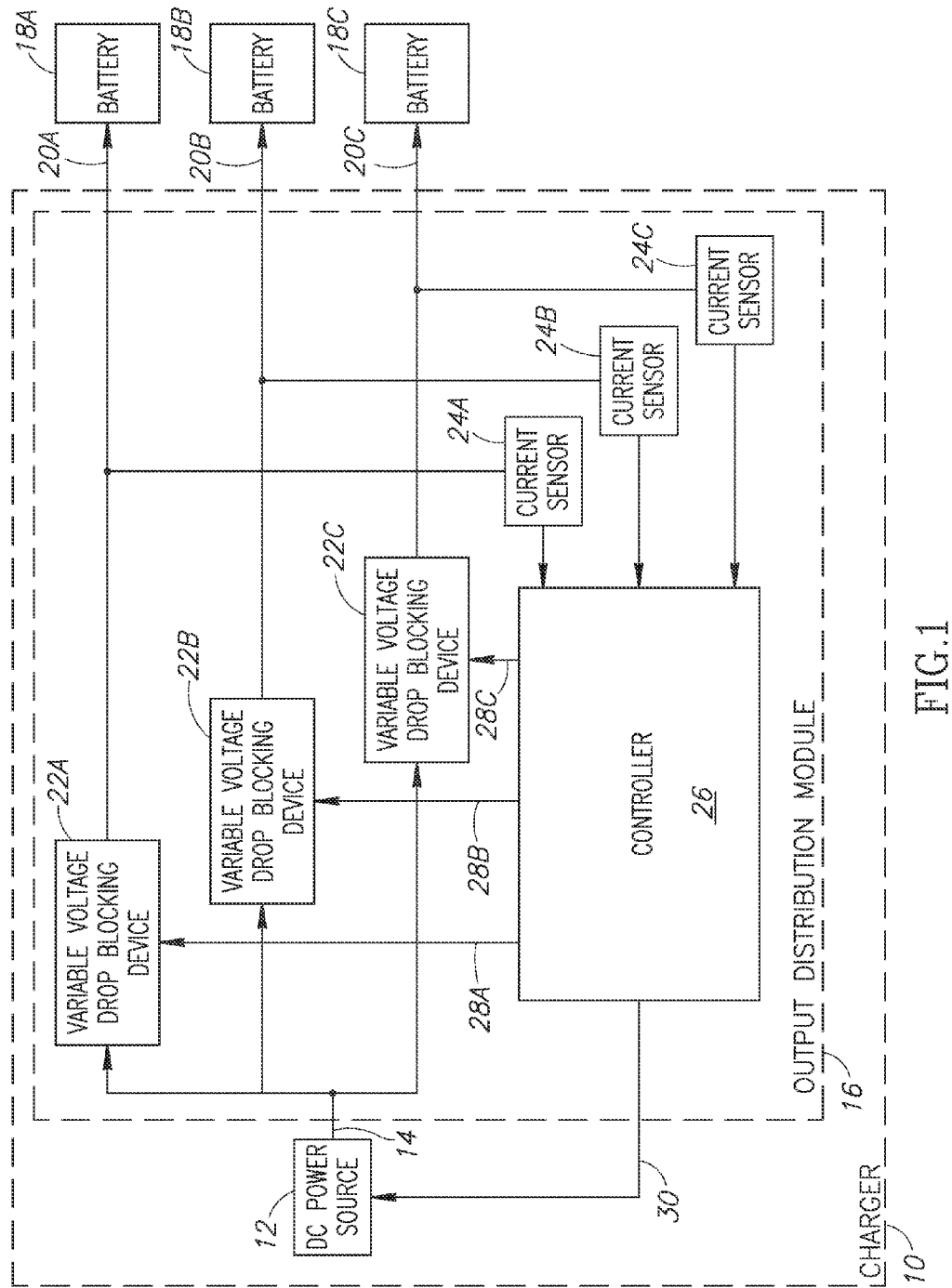
FIG. 1 illustrates a simplified block diagram of a multi-output battery charger according to an embodiment that includes variable voltage drop blocking devices.

FIG. 1 illustrates a block diagram of a multi-output battery charger 10 according to a first embodiment. The battery charger 10 includes a DC power source 12, such as an AC/DC power converter, having a single power source output terminal 14. The power source output terminal 14 is coupled in series with an output distribution module or circuitry 16 configured to distribute the power source output 14 to three batteries (or battery banks) 18A, 18B and 18C, via three output terminals 20A, 20B and 20C, respectively. For convenience, groups of components labeled with a number followed by a letter designation such as "A," "B," and "C" may be referred to generally herein without the letters (e.g., "batteries 18"). Other embodiments of the output distribution module 16 may utilize more or less output terminals 20, as desired. The output distribution module 16 includes variable voltage drop blocking devices 22A, 22B and 22C coupled between the power source output terminal 14 and the battery output terminals 20A, 20B and 20C, respectively. Each of the variable voltage drop blocking devices 22 ("blocking devices") is configured to supply current to one of the respective batteries 18 when the voltage of the power source output terminal 14 is greater than the voltage of its respective battery, and to isolate the battery from the power source output terminal (and from the other batteries) when the voltage of the power source output terminal is lower than the voltage of the respective battery.

The output distribution module 16 also comprises current sensors 24A, 24B and 24C coupled to the outputs of blocking devices 22A, 22B and 22C, respectively, configured to measure the battery charge currents delivered to the batteries 18A, 18B and 18C, respectively. Measured battery charge current signals are sent to a controller 26 configured to receive the signals, and to send blocking device control signals 28A, 28B and 28C to each of the blocking devices 22A, 22B and 22C, respectively, to control the voltage drop across each of the blocking devices. The controller 26 may also be configured to selectively control the voltage at the output terminal 14 of the power source 12 via control line 30.

In operation, the controller 26 may configure the power source 12 to provide an absorption stage voltage level while each of the blocking devices 22 are controlled to have a minimal voltage drop (e.g., 0-0.2 volts, etc.). The current sensors 24 then measure the charge current being delivered to each of the batteries 18. When the controller 26 receives signals from one of the current sensors 24 (e.g., sensor 24A), indicating the charge current delivered to one of the batteries 18 (e.g., battery 18A) is below a predetermined threshold, the controller may then control one of the blocking devices 22 (e.g., blocking device 22A) to increase its voltage drop (e.g., to 0.7 volts, 1.3 volts, etc.). Thus, the voltage applied to one of the batteries 18 is reduced from an absorption stage voltage level to a maintenance stage voltage level while the voltage applied to the other two batteries remains at the absorption voltage level. Similarly, the controller 26 may reduce the voltage delivered to the other two batteries 18 when it is determined their respective charge currents are below the threshold.

Once all of the batteries 18 are in a maintenance stage, in some embodiments the controller 26 may reduce the voltage drop across the blocking devices 22 and lower the voltage at the output terminal 14 of the power source 12 so that a maintenance stage voltage level is applied to each of the batteries 18. By reducing the voltage drop across the blocking devices 22 when possible, power dissipation is reduced.

Figure 2:
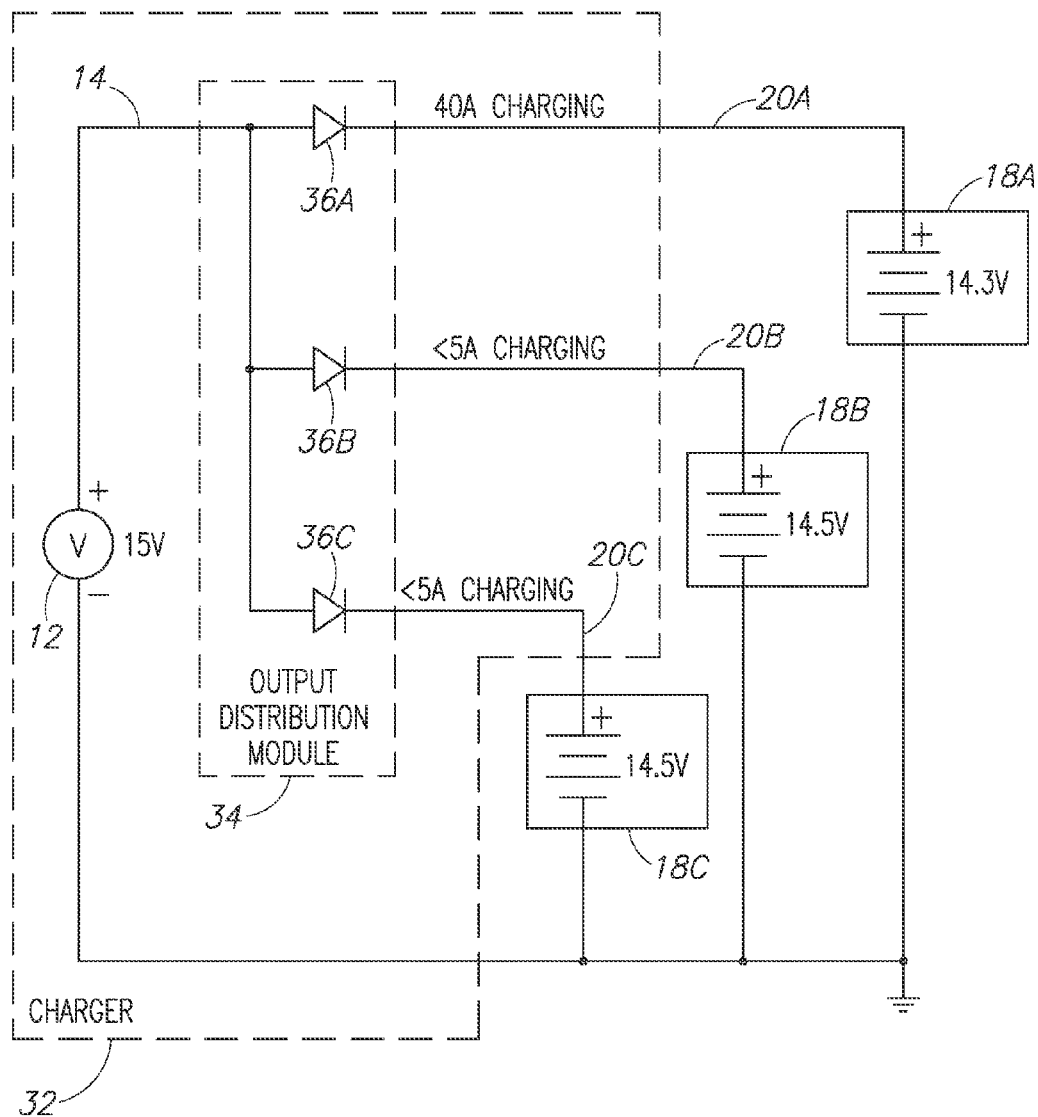
FIG. 2 illustrates a circuit schematic diagram for a first embodiment of a multi-output battery charger.

FIG. 2 illustrates a circuit schematic diagram for a multi-output battery charger 32 configured for charging the three batteries 18 also shown in FIG. 1. The battery charger includes the DC power source 12, such as an AC/DC converter, etc. The output terminal 14 of the power source 12 is coupled to output distribution circuitry 34 comprising three blocking diodes 36A, 36B and 36C. During a charging operation, when the voltage supplied by the power source 12 exceeds the voltage of the three batteries 18, the respective blocking diodes 36 are forward biased such that a charge current is delivered to the batteries. The blocking diodes 36 effectively isolate the batteries 18 from the power source 12 during periods when the voltage level of the power source is lower that the voltage across the batteries. Thus, the blocking diodes 36 allow current to pass to the batteries 18, but prevent back flow of current that could otherwise permit loads on one of the batteries to discharge another of the batteries. This also protects the redundancy of the batteries 18, providing, in the case of marine battery applications, the ability to reserve power for engine starting or performing critical communications functions.

Although the battery charger 32 shown in FIG. 2 provides effective isolation, the blocking diodes 36 have a voltage drop of approximately 0.7 volts, which consumes a significant amount power loss. At high currents, the blocking diodes 36 may also operate at high temperatures which can result in failure of the diodes.

Figure 3:
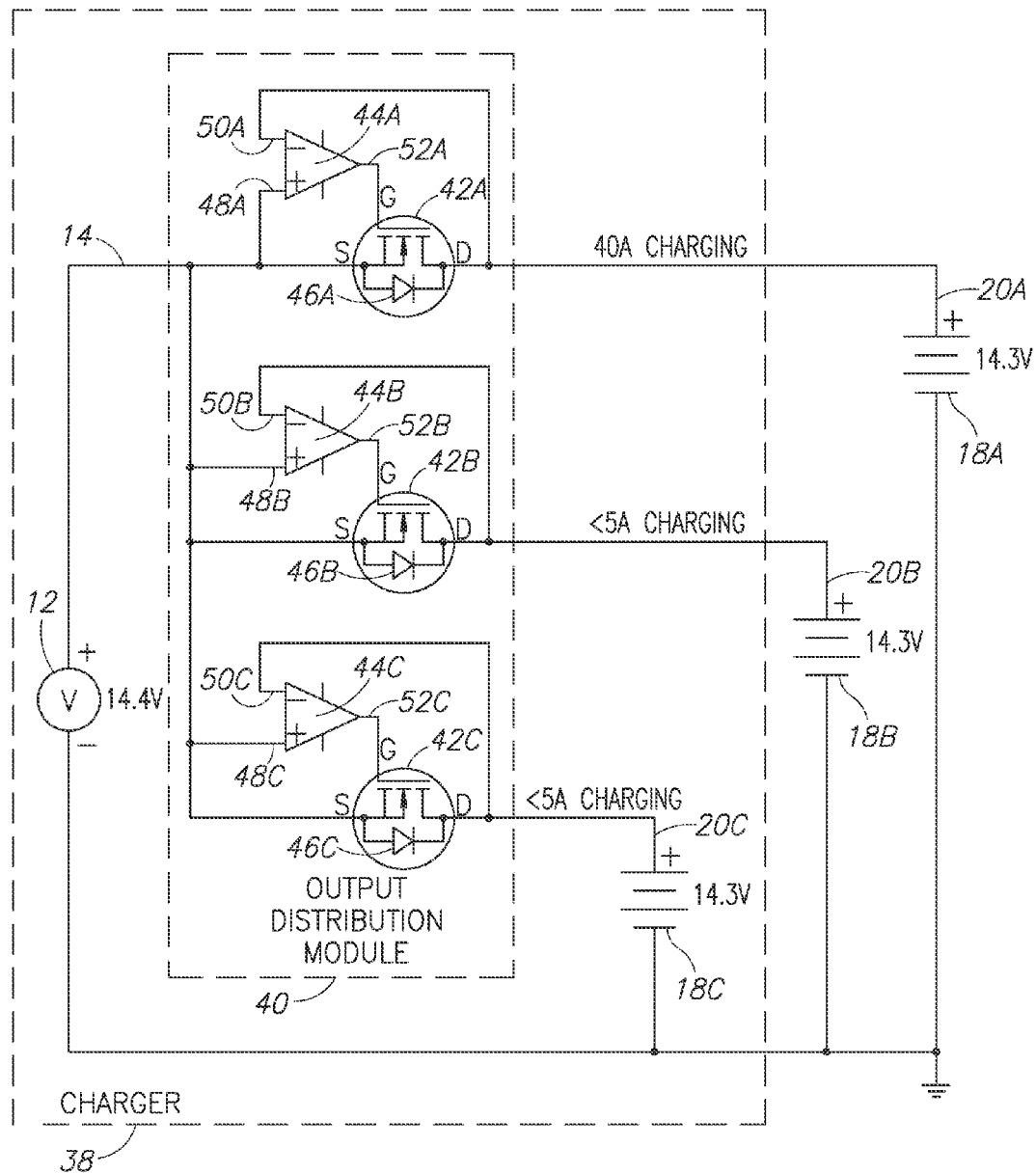
FIG. 3 illustrates a circuit schematic diagram for a second embodiment of a multi-output battery charger.

FIG. 3 illustrates another embodiment of a multi-output battery charger 38 including an output distribution module 40 configured to charge the three batteries 18. Components in the battery charger 38 that are also present in the battery chargers 10 and 32 shown in FIGS. 1 and 2, respectively, are labeled with the same reference numerals. In this embodiment, each of the blocking diodes 36 of the battery charger 32 shown in FIG. 2 is replaced with circuitry that functions like a diode but at a lower loss than the diodes. Specifically, the diodes 36A, 36B and 36C are replaced with n-channel enhancement metal-oxide semiconductor field-effect transistors (MOSFETs) 42A, 42B and 42C, respectively, and corresponding control amplifiers 44A, 44B and 44C, respectively.

The operation of the MOSFET 42A and the control amplifier 44A is now described. The operation of the MOSFETS 42B and 42C and control amplifiers 44B and 44C, respectively, is substantially the same. The MOSFET 42A is provided in series with the power source output terminal 14 and the output terminal 20A of the output distribution module 40, which is coupled to the battery 18A. The MOSFET 42A includes a source S, a drain D, and a control terminal or gate G. The MOSFET 42A also includes an intrinsic diode 46A associated with it between the source S and the drain D.

The control amplifier 44A includes a positive input 48A, a negative input 50A and an output 52A. The output 52A is connected to the control terminal G of the MOSFET 42A. The source S of the MOSFET 42A is connected to the positive input 48A of the control amplifier 44A and the drain D is connected to the negative input 50A of the control amplifier 44A. The intrinsic diode 46A has an effective anode connected to the power source output terminal 14 (and source S) and an effective cathode connected to the output distribution module output terminal 20A (and drain D). In operation, the intrinsic diode 46A conducts current from the power source output terminal 14 to the output distribution module output terminal 20A (also referred to as battery terminal 20A) and blocks current in the opposite direction.

When a higher voltage is on the power source output terminal 14 than the battery terminal 20A, the output 52A of the control amplifier 44A goes high turning the MOSFET 42A on to conduct current from the high voltage at the source S to the lower voltage at the drain D. Accordingly, current flows from the power source output terminal 14 to the battery terminal 20A to charge the battery 18A. It is noted that n-channel enhancement MOSFETs will conduct current from the source S to the drain D, even though they are often used in circuits to conduct current from the drain D to the source S.

When a higher voltage is at the battery terminal 20A than the power source output terminal 14, the output 52A of the control amplifier 44A goes low and is input to the control gate G of the MOSFET 42A to turn it off. The intrinsic diode 46A assists in the operation by blocking current flow because its cathode is connected to the battery terminal 20A and its anode is connected to the power source output terminal 14. Thus, the circuit functions as a diode in that it conducts current from the power source 12 to the battery 18A and blocks reverse current. Advantageously, the voltage drop across the MOSFET 42A is much lower than the voltage drop across a conventional diode, which substantially reduces power loss. As an example, the voltage drop across the MOSFET 42A may be approximately 0.1 volts, significantly less than the 0.7 volts drop for a conventional diode. Thus, the MOSFETs 42 and control amplifiers 44 provide the distribution and blocking functionality at a lower power loss than conventional blocking diodes.

Although the MOSFETs are depicted, the battery chargers disclosed herein may be modified to employ other types of transistors, including but not limited to n-channel depletion MOSFETs, p-channel depletion MOSFETs, and p-channel enhancement MOSFETs.

Figure 4:
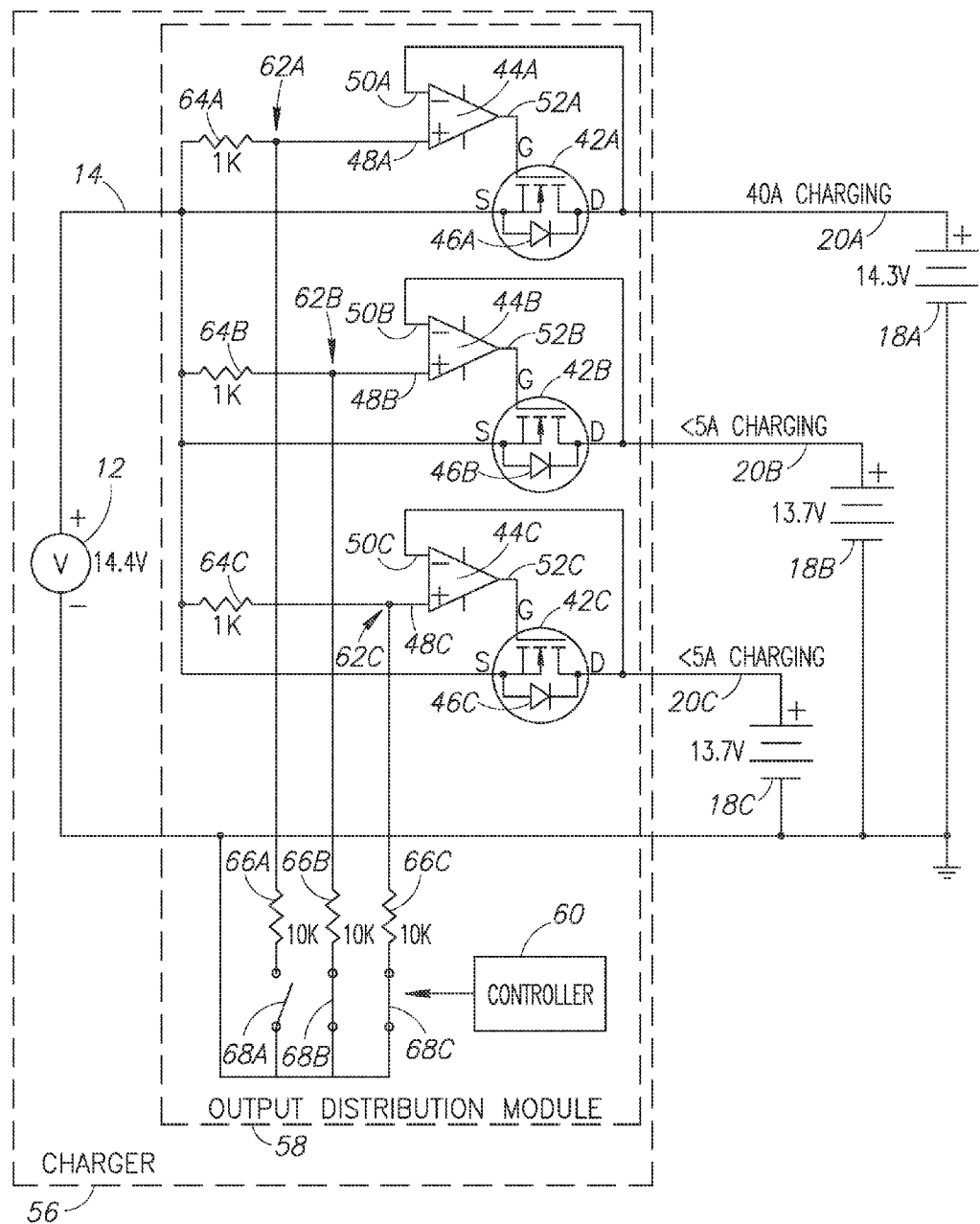
FIG. 4 illustrates a circuit schematic diagram for a third embodiment of a multi-output battery charger.

FIG. 4 illustrates a battery charger 56 that is an improvement upon the battery charger 38 shown in FIG. 3. In this embodiment, an output distribution module 58 comprises a charger control module or "controller" 60 configured to selectively modulate the operation of the MOSFETs 42 to perform both as highly efficient rectifiers ("on"), as illustrated in FIG. 3 and discussed above, and as conventional diodes utilizing their intrinsic diodes 46 ("off"). Thus, the voltage drop across each of the MOSFETs 42 is selectively controllable between two levels: approximately 0.1 volts when "on" and approximately 0.7 volts when "off."

In this embodiment, the positive input 48A of the control amplifier 44A is coupled to an output of a voltage divider 62A comprising resistors 64A and 66A that is enabled by a switch 68A operable by the controller 60. Similarly, the positive input 48B of the control amplifier 44B is coupled to an output of a voltage divider 62B comprising resistors 64B and 66B that is enabled by a switch 68B operable by the controller 60, and the positive input 48C of the control amplifier 44C is coupled to an output of a voltage divider 62C comprising resistors 64C and 66C that is enabled by a switch 68C operable by the controller. In this example, the resistors 64 have a value of 1 kΩ and the resistors 66 have a value of 10 kΩ. Given the output terminal 14 of the power source 12 is at 14.4 volts in this example, the voltage at the output of the voltage dividers 62 will be approximately 13.1 volts (i.e., 14.4 volts× (10 kΩ/(10 kΩ+1 kΩ)) when the switches 68 are closed. When the switches 68 are opened, the resistors 64 will pull the voltage at the positive inputs 48 of the control amplifiers 44 (i.e., the voltage divider output) up to the voltage of the output terminal 14 of the power source 12, i.e., to 14.4 volts.

In operation, when the switches 68 are open so that the voltage at the output of the voltage dividers 62 (positive inputs 48 of the amplifiers 44) is greater than the voltage at the battery terminals 20 (i.e., 14.4 volts and 14.3 volts, respectively), the outputs 52 of the control amplifiers 44 go high turning the MOSFETs 42 on to conduct current from the high voltage at the sources S to the lower voltage at the drains D. Accordingly, current flows from the power source output terminal 14 to the battery output terminals 20 (e.g., output terminal 20A) to charge the batteries 18 (e.g., battery 18A). When the switches 68 are closed so that the voltages at the battery output terminals 20 are higher than the positive inputs 48 of the control amplifiers 44, the outputs 52 of the control amplifiers go low and are input to the control gates G of the MOSFETs 42 to turn them off so that they act as conventional diodes, as discussed above.

The controller 60 (or "charger control module") is coupled to current sensors (not shown in FIG. 4 for clarity), such as the current sensors 24 shown in FIG. 1. The current sensors are operative to sense the charge current being delivered to each of the batteries 18 and to provide a charge current-related signal to the controller 60.

Using the charge current-related signals received from the current sensors, the controller 60 determines whether each of the batteries 18 should be charged in the higher voltage level absorption stage or in the lower level maintenance stage. In the example shown in FIG. 4, the battery 18A is relatively discharged and is drawing 40 amperes (A), whereas batteries 18B and 18C are closer to fully charged and are drawing less than 5 A. The controller 60, receiving signals from current sensors indicating that the battery 18A should be maintained in the absorption stage, opens the switch 68A so that the MOSFET 42A is turned on and the voltage applied to the battery 18A is approximately 14.3 volts (i.e., the power source voltage of 14.4 volts less the 0.1 volts drop across the turned on MOSFET).

Conversely, the controller 60 receives signals from the current sensors indicating the batteries 18B and 18C are fully charged and can be transitioned to the maintenance stage. The controller 60 therefore closes the switches 68B and 68C, which causes the MOSFETS 42B and 42C, respectively, to turn off and act as conventional diodes with an approximately 0.7 volts drop. Thus, a lower maintenance voltage of approximately 13.7 volts is applied to the batteries 18A and 18B (i.e., the power source voltage of 14.4 volts less the 0.7 volts drop across the turned off MOSFETs 42B and 42C) so they are not subjected to the full absorption voltage once they are substantially fully charged, while the full absorption voltage is applied to the battery 18A until it is also ready to transition to the maintenance voltage level.

The transition from the absorption stage to the maintenance stage may be determined by the battery charger 56 sensing the value of charge current and then switching over when the charge current drops below a certain threshold, by a minimum/maximum timer, or by a combination thereof. For example, the battery charger 56 may switch a battery 18 out of the absorption stage when its charge current falls below 5 amperes (A) after the absorption mode has lasted for one hour, or when the absorption mode has lasted for 8 hours. In some embodiments, the battery charger 56 may switch out of the absorption stage when the charge current falls below 1-2% of a battery's capacity. Other thresholds may be used.

As discussed above, once all of the batteries 18 have entered the maintenance mode (i.e., all MOSFETs 42 are turned off), the controller 60 may turn the MOSFETs back on by opening the switches 68 and simultaneously reducing the voltage at the output terminal 14 of the power source 12 so that a maintenance voltage (e.g., 13.7 volts) is applied to all three batteries. Doing so will reduce the voltage drop across the MOSFETs 42 from approximately 0.7 volts to approximately 0.1 volts, which reduces power loss.

Figure 5:
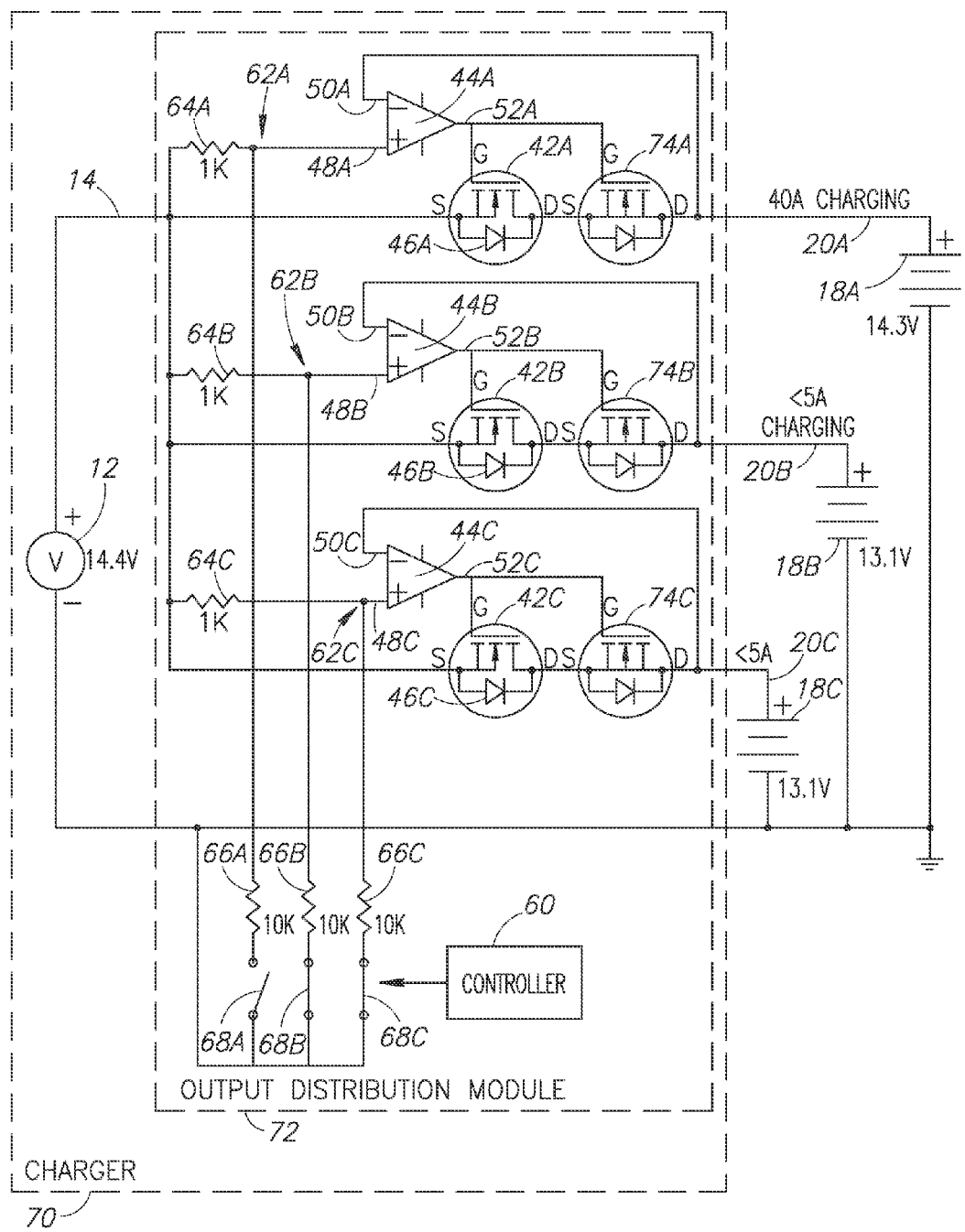
FIG. 5 illustrates a circuit schematic diagram for a fourth embodiment of a multi-output battery charger.

FIG. 5 illustrates another embodiment of a multi-output battery charger 70 comprising an output distribution module 72. The battery charger 70 is similar to the battery charger 56 shown in FIG. 4 in many respects, so a detailed explanation of each component is not necessary. In this embodiment, rather than using the single MOSFET 42 in series between the power source 12 and each of the batteries 18 for the blocking device, the output distribution module 72 comprises two MOSFETs 42 and 74 in series with each other. Specifically, MOSFETs 42A and 74A are coupled between the power source output 14 and the battery output terminal 20A, MOSFETs 42B and 74B are coupled between the power source output 14 and the battery terminal output 20B, and MOSFETs 42C and 74C are coupled between the power source output 14 and the battery output terminal 20C. Using this configuration, the voltage drop can be increased to approximately 1.2-1.4 volts (i.e., approximately 0.6-0.7 volts for each MOSFET in series) when the controller 60 turns the MOSFETs 42 and 74 off.

In some embodiments, more than two MOSFETs are coupled in series to further increase the selectable voltage drop. Further, although the control gates G of each pair of MOSFETs 42 and 74 are coupled to the outputs 52 of the control amplifiers 44, in other embodiments the pair of MOSFETs may be controlled independently, which allows for three controllable voltage drop levels: approximately 0.2 volts (both MOSFETs on); approximately 0.7-0.8 volts (one MOSFET on, one MOSFET off); and approximately 1.2-1.4 volts (both MOSFETS off).

Multiple solid state devices may also be combined with more complex controls to provide a controllable voltage drop instead of one defined by diodes.

Figure 6:
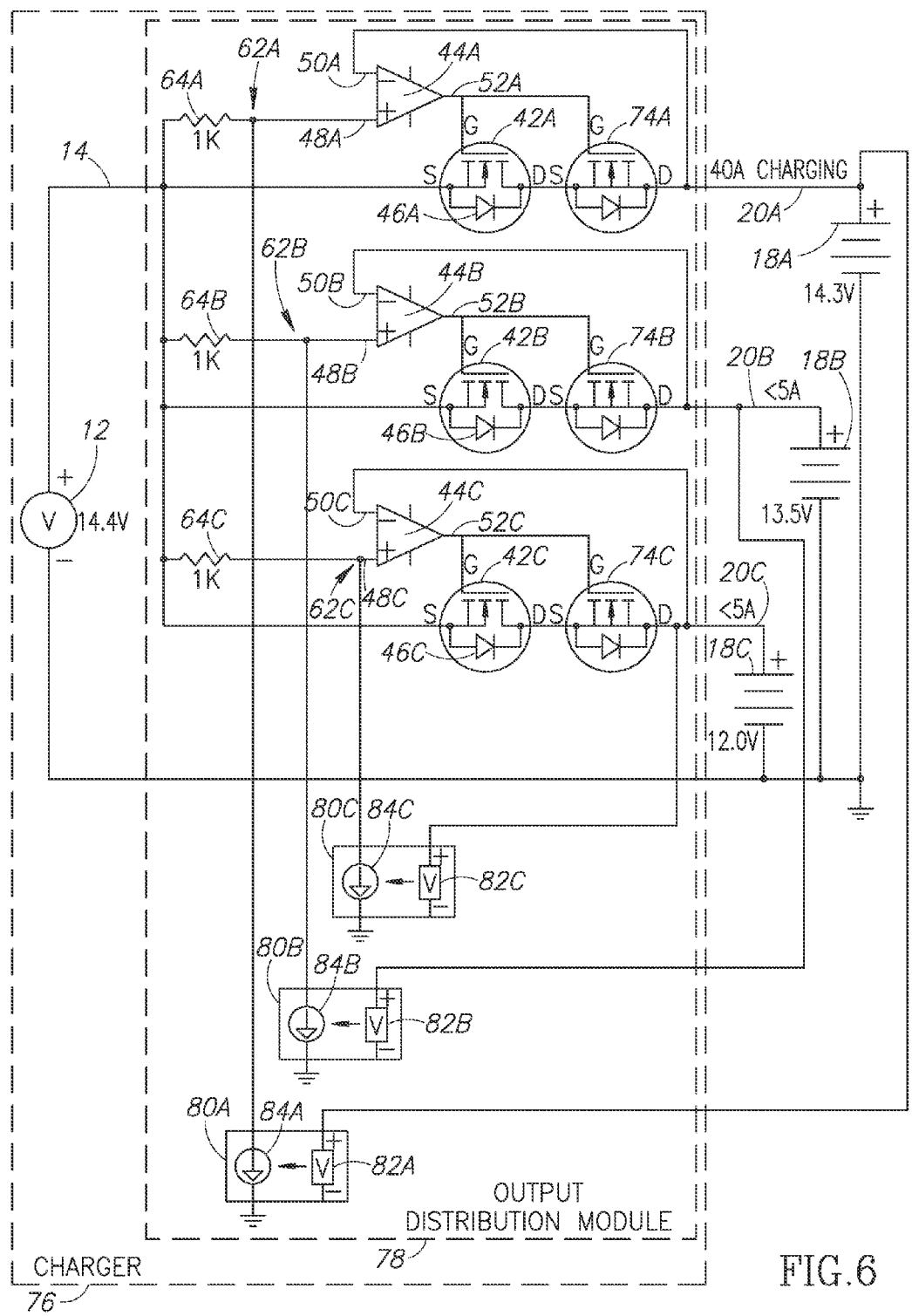
FIG. 6 illustrates a circuit schematic diagram for a fifth embodiment of a multi-output battery charger.

FIG. 6 illustrates another embodiment of a multi-output battery charger 76 comprising an output distribution module 78. The battery charger 76 is similar to the battery charger 70 shown in FIG. 5 in many respects, so a detailed explanation of each component is not necessary. In this embodiment, the voltage divider switches 68 and resistors 66 shown in FIG. 5 are replaced with voltage controlled current sources 80. The voltage controlled current sources 80 have voltage sensors 82 connected to the battery output terminals 20, and current sources 84 connected to the positive inputs 48 of the respective control amplifiers 44. The voltage controlled current sources 80 are each representative of a feedback component (e.g., an error amplifier) that is operative to match the output voltages at the battery terminals 20 to a selected target voltage. Such a component may be analog, constructed by using an analog-to-digital conversion, digital logic and/or digital-to-analog conversion, to produce a feedback voltage command.

A further feature that may be utilized in one or more of the above-described embodiments is that the lowest resistance/voltage drop state of a solid state device may be biased in an analog region. In this region, in the case of a MOSFET, the channel resistance is not driven completely to a minimum but instead is driven to a fixed value via the feedback loops shown in FIG. 6. The biasing circuitry for the MOSFETs is not shown for clarity. As can be appreciated, biasing the MOSFETs in the analog region limits possible instantaneous fault currents and allows a more rapid response to any condition that may possibly produce reverse current.

As discussed above, DC power sources other than an AC/DC converter of a battery charger may be used. Such sources may be solar panels, the regulated output of solar panels, wind generators, alternators, etc. Further, although typical voltages for 12 volt lead-acid batteries are shown in the figures and discussed above, the embodiments disclosed herein may be applied to a broad range of battery types, voltages, currents, and charge profiles.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A battery charger for charging at least a first battery having a first battery terminal and a second battery having a second battery terminal, the battery charger comprising:

a power supply having a power supply output operative to provide direct current to a load;

a distribution module having a distribution module input operatively coupled to the power supply output, a first distribution module output couplable to the first battery terminal to provide direct current to the first battery, a second distribution module output couplable to the second battery terminal to provide direct current to the second battery, a first blocking device coupled between the distribution module input and the first distribution module output, a second blocking device coupled between the distribution module input and the second distribution module output, wherein a voltage drop across the first blocking device and a voltage drop across the second blocking device are selectively controllable by first and second blocking device control signals, respectively;

a first current sensor operative to detect a first battery charge current and to provide a first battery charge current-related signal for the first battery coupled to the first distribution module output;

a second current sensor operative to detect a second battery charge current and to provide a second battery charge current-related signal for the second battery coupled to the second distribution module output; and a charger control module operatively coupled to the power supply, the first and second current sensors, and the first and second blocking devices, the charger control module configured to receive the first and second battery charge current-related signals from the first and second current sensors, respectively, and to independently provide the first and second blocking device control signals to the first and second blocking devices, respectively, dependent on the received first and second battery charge current-related signals, respectively.

2. The battery charger of claim 1, wherein the charger control module is operative to send the first blocking device control signal to the first blocking device to increase the voltage drop across the first blocking device when the first battery charge current-related signal received from the first current sensor indicates the first battery charge current is below a first battery predetermined level, and is further operative to send the second blocking device control signal to the second blocking device to increase the voltage drop across the second blocking device when the second battery charge current-related signal received from the second current sensor indicates the second battery charge current is below a second battery predetermined level.

3. The battery charger of claim 1, wherein each of the first and second blocking devices comprises a solid state device and control circuitry coupled thereto.

4. The battery charger of claim 3, wherein the solid state device comprises a metal-oxide-semiconductor field-effect transistor (MOSFET).

5. The battery charger of claim 3, wherein each of the first and second blocking devices comprises two solid state devices coupled in series and control circuitry coupled thereto.

6. The battery charger of claim 1, wherein the charger control module is operative to send the first blocking device control signal to the first blocking device to decouple the distribution module input from the first distribution module output, and to send the second blocking device control signal to the second blocking device to decouple the distribution module input from the second distribution module output.

7. The battery charger of claim 1, wherein the power supply is configured to provide direct current to a lead-acid battery.

8. The battery charger of claim 1, wherein the power supply comprises an AC/DC switched-mode power converter.

9. The battery charger of claim 1, wherein the power supply comprises an output from one of a solar panel, wind generator and an alternator.

10. The battery charger of claim 1, wherein the battery charger is configured for charging a third battery having a third battery terminal, the distribution module further comprising:

a third distribution module output couplable to the third battery terminal to provide direct current to the third battery, the battery charger further comprising:

a third blocking device coupled between the distribution module input and the third distribution module output, wherein a voltage drop across the third blocking device is selectively controllable a third blocking device control signal; and a third current sensor operative to detect a third battery charge current and to provide a third battery charge current-related signal for the third battery coupled to the third distribution module output;

wherein the charger control module is operatively coupled to the third blocking device and configured to receive the third battery charge current-related signal from the third current sensor and to provide the third blocking device control signal to the third blocking device dependent on the third battery charge current related signal.

11. The battery charger of claim 10, wherein at least one of the first, second and third blocking devices comprises a solid state device and control circuitry coupled thereto.

12. The battery charger of claim 1, wherein each of the first and second blocking devices comprises a metal-oxide-semiconductor field-effect transistor (MOSFET) coupled to a control amplifier.

13. The battery charger of claim 1, wherein each of the first and second blocking devices comprises a metal-oxide-semiconductor field-effect transistor (MOSFET) coupled to control circuitry configured to bias the MOSFET in an analog operating region.

14. The battery charger of claim 1, wherein each of the first and second blocking devices comprises a metal-oxide-semiconductor field-effect transistor (MOSFET) coupled to control circuitry comprising a voltage controlled current source.

15. The battery charger of claim 1, wherein the charger control module is operative to selectively control a voltage level of the output of the power supply.

16. A battery charger for charging a plurality of rechargeable batteries, each having a terminal, the battery charger comprising:

a power supply having an output operative to provide direct current to a load, the output of the power supply having a selectively controllable voltage level;

a distribution module having a distribution module input operatively coupled to the power supply output and a plurality of distribution module outputs each couplable to the terminal of one of the plurality of batteries to provide direct current thereto, the distribution module further comprising a plurality of variable voltage drop blocking devices each being coupled between the distribution module input and one of the plurality of distribution module outputs, wherein for each of the blocking devices a voltage drop between the distribution module input and a respective distribution module output is selectively controllable by a blocking device control signal, and each of the blocking devices is configured to pass current between the distribution module input and a respective one of the plurality of distribution module outputs and to block current in the reverse direction;

for each of the plurality of distribution module outputs, a current sensor adapted to detect a battery charge current and to provide a battery charge current-related signal for each battery coupled to a distribution module output; and a charger control module operatively coupled to the current sensors and responsive to the battery charge current-related signal received therefrom, the charger control module further operatively coupled to each of the plurality of blocking devices and operative to provide a blocking device control signal thereto to selectively control the voltage for each respective blocking device dependent on a respective battery charge current-related signal.

17. A battery charger for charging at least a first battery having a first battery terminal and a second battery having a second battery terminal using power from a power supply having a power supply output operative to provide direct current to a load, the battery charger comprising:

a distribution module having a distribution module input operatively coupled to the power supply output, a first distribution module output couplable to the first battery terminal to provide direct current to the first battery, a second distribution module output couplable to the second battery terminal to provide direct current to the second battery, a first blocking device coupled between the distribution module input and the first distribution module output, a second blocking device coupled between the distribution module input and the second distribution module output, wherein a voltage drop across the first blocking device and a voltage drop across the second blocking device are selectively controllable by first and second blocking device control signals, respectively;

a first current sensor operative to detect a first battery charge current and to provide a first battery charge current-related signal for the first battery coupled to the first distribution module output;

a second current sensor operative to detect a second battery charge current and to provide a second battery charge current-related signal for the second battery coupled to the second distribution module output; and a charger control module operatively coupled to the power supply, the first and second current sensors, and the first and second blocking devices, the charger control module configured to receive the first and second battery charge current-related signals from the first and second current sensors, respectively, and to independently provide the first and second blocking device control signals to the first and second blocking devices, respectively, dependent on the received first and second battery charge current-related signals, respectively.

18. The battery charger of claim 17, wherein the charger control module is operative to send the first blocking device control signal to the first blocking device to increase the voltage drop across the first blocking device when the first battery charge current-related signal received from the first current sensor indicates the first battery charge current is below a first battery predetermined level, and is further operative to send the second blocking device control signal to the second blocking device to increase the voltage drop across the second blocking device when the second battery charge current-related signal received from the second current sensor indicates the second battery charge current is below a second battery predetermined level.

19. The battery charger of claim 17, wherein each of the first and second blocking devices comprises a solid state device and control circuitry coupled thereto.

20. The battery charger of claim 19, wherein the solid state device comprises a metal-oxide-semiconductor field-effect transistor (MOSFET).

21. The battery charger of claim 19, wherein each of the first and second blocking devices comprises two solid state devices coupled in series and control circuitry coupled thereto.

22. The battery charger of claim 17, wherein the charger control module is operative to send the first blocking device control signal to the first blocking device to decouple the distribution module input from the first distribution module output, and to send the second blocking device control signal to the second blocking device to decouple the distribution module input from the second distribution module output.

23. The battery charger of claim 17, wherein the distribution module input is couplable to an AC/DC switched-mode power converter.

24. The battery charger of claim 17, wherein the battery charger is configured for charging a third battery having a third battery terminal, the distribution module further comprising:

a third distribution module output couplable to the third battery terminal to provide direct current to the third battery, the battery charger further comprising:

a third blocking device coupled between the distribution module input and the third distribution module output, wherein a voltage drop across the third blocking device is selectively controllable a third blocking device control signal; and a third current sensor operative to detect a third battery charge current and to provide a third battery charge current-related signal for the third battery coupled to the third distribution module output;

wherein the charger control module is operatively coupled to the third blocking device and configured to receive the third battery charge current-related signal from the third current sensor and to provide the third blocking device control signal to the third blocking device dependent on the third battery charge current-related signal.

25. The battery charger of claim 24, wherein at least one of the first, second and third blocking devices comprises a solid state device and control circuitry coupled thereto.

26. The battery charger of claim 17, wherein each of the first and second blocking devices comprises a metal-oxide-semiconductor field-effect transistor (MOSFET) coupled to a control amplifier.

27. The battery charger of claim 17, wherein each of the first and second blocking devices comprises a metal-oxide-semiconductor field-effect transistor (MOSFET) coupled to control circuitry configured to bias the MOSFET in an analog operating region.

28. The battery charger of claim 17, wherein each of the first and second blocking devices comprises a metal-oxide-semiconductor field-effect transistor (MOSFET) coupled to control circuitry comprising a voltage controlled current source.

29. The battery charger of claim 17, wherein the charger control module is operative to selectively control a voltage level of the output of the power supply.

30. The battery charger of claim 17, wherein the first and second blocking devices permit current flow in a first direction and block current flow in a second direction opposite the first direction, the first and second blocking devices being configured to be transitioned between a first state wherein the first and second blocking devices cause a first voltage drop and a second state wherein the first and second blocking devices cause a second voltage drop different from the first voltage drop.

31. A battery charger for charging a plurality of rechargeable batteries, each having a terminal, using a power supply having an output operative to provide direct current to a load, the battery charger comprising:

a distribution module having a distribution module input operatively coupled to the power supply output and a plurality of distribution module outputs each couplable to the terminal of one of the plurality of batteries to provide direct current thereto, the distribution module further comprising a plurality of variable voltage drop blocking devices each being coupled between the distribution module input and one of the plurality of distribution module outputs, wherein for each of the blocking devices a voltage drop between the distribution module input and a respective distribution module output is selectively controllable by a blocking device control signal, and each of the blocking devices is configured to pass current between the distribution module input and a respective one of the plurality of distribution module outputs and to block current in the reverse direction;

for each of the plurality of distribution module outputs, a current sensor adapted to detect a battery charge current and to provide a battery charge current-related signal for each battery coupled to a distribution module output; and a charger control module operatively coupled to the current sensors and responsive to the battery charge current-related signal received therefrom, the charger control module further operatively coupled to each of the plurality of blocking devices and operative to provide a blocking device control signal thereto to selectively control the voltage for each respective blocking device dependent on a respective battery charge current-related signal.

* * * * *